May 28, 1968     M. R. GARNIER     3,385,509
GAS TURBINE ENGINES HAVING CONTRA-ROTATING COMPRESSORS
Filed Dec. 1, 1966
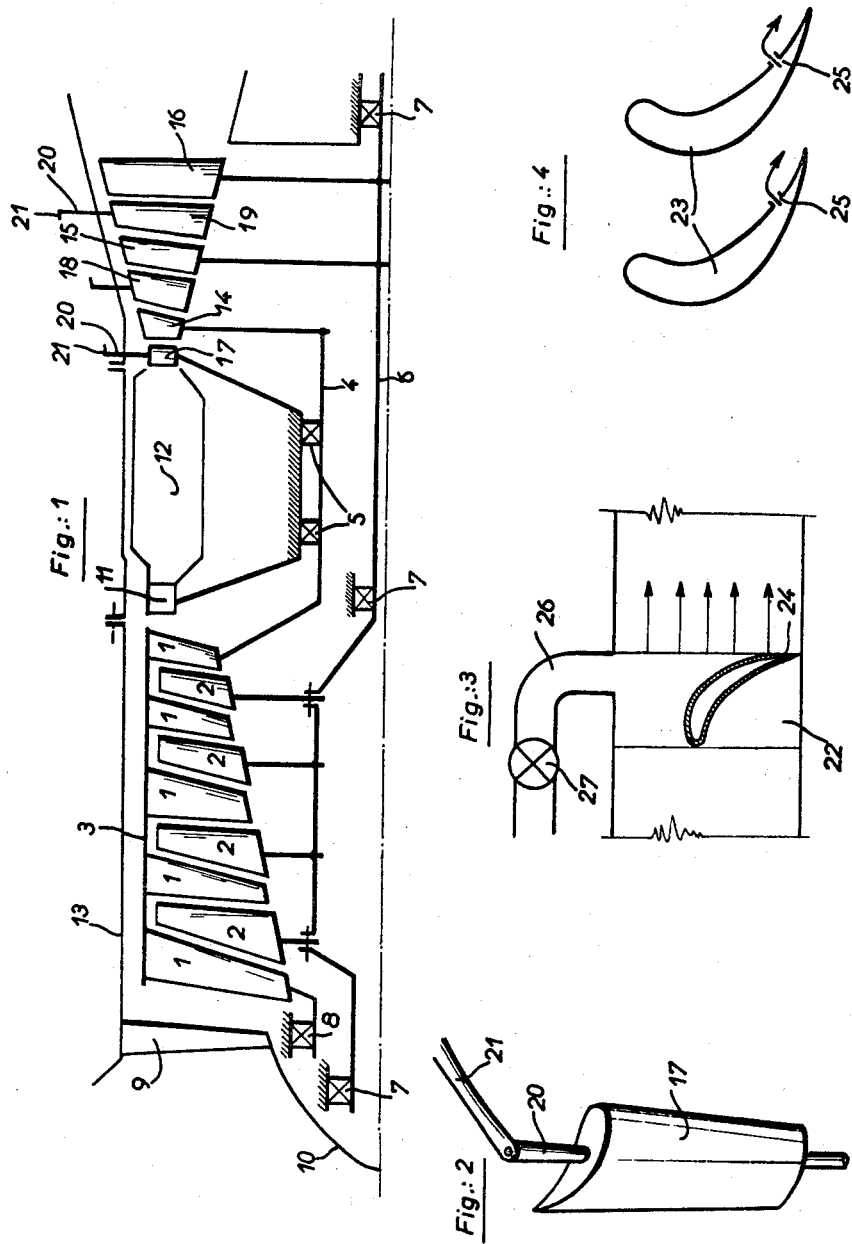
Inventor
Michel Robert Garnier
by Watson, Cole, Grindle & Watson
Attorneys

United States Patent Office 3,385,509
Patented May 28, 1968

3,385,509
GAS TURBINE ENGINES HAVING CONTRA-ROTATING COMPRESSORS
Michel Robert Garnier, Sceaux, France, assignor to Societe Nationale d'Etude et de Construction de Moteurs d'Aviation, Paris, France, a company of France
Filed Dec. 1, 1966, Ser. No. 598,422
Claims priority, application France, Dec. 2, 1965, 40,657
5 Claims. (Cl. 230—116)

ABSTRACT OF THE DISCLOSURE

A gas turbine engine having contra-rotating, compressor-turbine sets wherein the speed of each compressor-turbine set is controlled by adjustable gas deflecting vanes positioned upstream of each turbine.

---

This invention relates to a gas turbine engine having a contra-rotating compressor comprising coaxial rotors which are driven in opposite directions by a turbine. The turbine preferably comprises at least two sets of blades which in use rotate in opposite directions and which are respectively coupled by means of two coaxial drive shafts to two contra-rotating rotors of the compressor.

One object of the present invention is to provide correct adjustment and to improve the stability of the compressor at low speeds by controlling the relative distribution of the load between the two sets of blades of the turbine.

The method of controlling the gas flow to a turbine by adjusting the cross-sectional area at the intake thereof is well known. The present invention applies this method to the inlet guide vanes of two stages or two groups of stages of the turbine which respectively drive the two contra-rotating rotors of the compressor.

The variation in the cross-sectional area at the inlet to the turbine can be effected in various known ways such as: pivotal movement of the guide vanes, by means of a supplementary jet of air at the trailing edge of the guide vanes, or by means of a jet of air at the inner concave surface of the guide vanes.

The invention will now be further described with reference to the accompanying drawings which show, by way of example, a gas turbine engine, together with a modification thereof, constructed in accordance with the invention.

In the drawing:
FIGURE 1 is an axial half-sectional view of the gas turbine engine,
FIGURE 2 is a perspective view of a guide vane of the turbine of the engine, and
FIGURES 3 and 4 are somewhat diagrammatic views of the guide vane in the modified form of engine in accordance with the invention.

The gas turbine engine shown in FIGURE 1 comprises a first rotor having a number of sets of blades 1 attached at the outer peripheries thereof to the inner surface of a rotatable drum 3 which in use is driven in one direction by a shaft 4 rotatably mounted in bearings 5. A second shaft 6, coaxial with the shaft 4, is rotatably mounted in bearings 7, and in use drives a second rotor having a number of sets of blades 2 in the opposite direction to the direction of rotation of the blades 1. The sets of blades of the two rotors are arranged alternately in sequence in the axial direction.

A forward bearing 8 is provided for the first rotor. The contra-rotating compressor thus formed is preceded by inlet guide means 9 to which the forward cowling 10 is attached, and the compressor is followed by outlet guide means 11 which lead the air into a combustion chamber 12 of the engine. The assembly is enclosed by a fixed casing 13.

The shaft 4 of the first rotor of the contra-rotating compressor is driven by a single set of turbine blades 14, and two further sets of turbine blades 15 and 16 drive the shaft 6 of the second rotor in the opposite direction. The moving sets of turbine blades 14, 15 and 16 are respectively preceded by sets of guide vanes 17, 18 and 19 and in accordance with the present invention, these sets of guide vanes govern the effective cross-sectional area through which the air flows to the blades 15 and 16.

The adjustment in the cross-sectional area is obtained by varying the angular position of the turbine guide vanes, which are pivotally mounted about radial axes 20 (FIGURE 2), the pivotal position being controlled by means of a rod 21. The mechanical means for effecting such control are not described herein, since such means are well known and are described for example in U.S. Patent No. 2,305,311.

In the modification shown in FIGURE 4, aerodynamic adjustment is used, the principle of this being well known. For this purpose, use is made of hollow turbine guide vanes such as those shown at 22 (FIGURE 3) or 23 (FIGURE 4), in which the inner space is externally vented by means of an elongated slot extending along the trailing edge, as at 24, or on the concave surface, as at 25. These slots are supplied with pressurized fluid bled from a suitable source, for example one stage of the compressor, and conveyed by way of a duct 26 provided with a valve 27.

The action of the jets issuing from the slots formed in the hollow guide vanes and the consequent aerodynamic control which affects the supply of fluid to the sets of turbine blades are well known, and are described in the French specification No. 1,030,483.

An increase in the effective cross-sectional area of the guide vanes by the mechanical or aerodynamic means previously described enables a higher air flow rate to be obtained, thereby stabilising the compressor. The turbines, however, as they supply more power, accelerate the compressor and tend to make the latter less stable. Adjustment can be carried out to correct whichever effect is predominant. Normally the effective cross-sectional area will be decreased, that is, the vanes will be adjusted so as to bring the mean plane of each of them nearer to the plane of the guide means in the mechanical arrangement (FIGURE 2), whereas the valve will be open in the aerodynamic arrangement (FIGURES 3 and 4).

By this means, the speed of each of the two contra-rotating compressor rotors will decrease, and this will prevent surging when the flow rate through the compressor decreases more rapidly than the speed. This arrangement has the advantage that at normal speeds no flow of pressurized air radially of the guide vanes is necessary.

What I claim is:
1. A gas turbine engine having a contra-rotating compressor comprising two coaxial rotors the blades of which are arranged alternately in sequence, two sets of turbine blades respectively connected to the two rotors and in use driving the latter in mutually opposite directions, two sets of guide vanes respectively associated with the two sets of turbine blades, and means to adjust, radially of each of the guide vanes, the effective inlet cross-sectional area of said sets of turbine blades.

2. A gas turbine engine according to claim 1, wherein said means for adjusting the effective inlet cross-sectional area are constituted by pivotally mounting the sets of guide vanes.

3. A gas turbine engine according to claim 1, wherein said guide vanes are hollow and said means are constituted by slots in the guide vanes which in use are supplied with fluid under pressure.

4. A gas turbine engine according to claim 3, wherein said slots are disposed along the trailing edge of the guide vanes.

5. A gas turbine engine according to claim 3, wherein said slots are disposed on a concave surface of the guide vanes.

References Cited

UNITED STATES PATENTS

| 2,505,660 | 4/1950 | Baumann | 60—39.16 XR |
| 2,505,796 | 5/1950 | Sedille | 60—39.25 XR |
| 2,825,532 | 3/1958 | Kadosch et al. | |
| 2,885,856 | 5/1959 | Pedersen | 60—39.25 |
| 3,209,537 | 10/1965 | Mock | 60—39.25 XR |

CARLTON R. CROYLE, *Primary Examiner.*